(12) United States Patent
Ryu et al.

(10) Patent No.: US 11,762,251 B2
(45) Date of Patent: Sep. 19, 2023

(54) DISPLAY DEVICE

(71) Applicant: Samsung Display Co., Ltd., Yongin-Si (KR)

(72) Inventors: Gwon-Heon Ryu, Cheonan-si (KR); Kwi Hyun Kim, Seongnam-si (KR); Kook Hyun Choi, Asan-si (KR); Woo Gun Kang, Incheon (KR); Kyung Won Park, Seoul (KR); Jin Su Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/543,725

(22) Filed: Dec. 6, 2021

(65) Prior Publication Data

US 2022/0107537 A1 Apr. 7, 2022

Related U.S. Application Data

(62) Division of application No. 16/802,442, filed on Feb. 26, 2020, now Pat. No. 11,226,527.

(30) Foreign Application Priority Data

Apr. 30, 2019 (KR) ........................ 10-2019-0050337

(51) Int. Cl.
G02F 1/1362 (2006.01)

(52) U.S. Cl.
CPC .. *G02F 1/136286* (2013.01); *G02F 1/136213* (2013.01); *G02F 1/136227* (2013.01); *G02F 2201/123* (2013.01)

(58) Field of Classification Search
CPC ........ G02F 1/136286; G02F 1/136227; G02F 1/136213; G02F 1/134309; G02F 2203/30; G02F 1/134345; G02F 2201/123; G02F 1/133707; G02F 1/13624; G02F 1/134336; G02F 1/1368; G02F 2201/122;
(Continued)

(56) References Cited

U.S. PATENT DOCUMENTS 6,429,907 B1   8/2002   Park et al.
10,281,784 B1   5/2019   Lee
(Continued)

FOREIGN PATENT DOCUMENTS

KR   10-0905015 B1   6/2009
KR   10-1240646 B1   3/2013
(Continued)

*Primary Examiner* — Hoan C Nguyen
(74) *Attorney, Agent, or Firm* — Innovation Counsel LLP

(57) ABSTRACT

A display device according to an embodiment of the present inventive concept includes: a substrate including a first region and a second region; and a plurality of pixels disposed on the substrate, wherein the plurality of pixels each include a first data line and a second data line overlapping a pixel electrode, a first capacitance between the first data line and the pixel electrode is smaller than a second capacitance between the second data line and the pixel electrode in a pixel disposed in the first region, and the first capacitance between the first data line and the pixel electrode is larger (Continued)

than the second capacitance between the second data line and a pixel electrode in the pixel disposed in the second region.

6 Claims, 17 Drawing Sheets

(58) Field of Classification Search
CPC ......... G02F 1/136218; G02F 1/133345; G02F 1/133514; G02F 1/13434; G02F 1/13439; G02F 1/136209; G02F 1/136295; G02F 2202/103; G09G 3/3648; G09G 2320/0223; G09G 2320/0233; G09G 2300/0426; G09G 3/3688; G09G 2310/08; G09G 3/3607; G09G 3/3677; G09G 3/3614; G09G 3/3611; G09G 2320/0219; G09G 2320/0209; G09G 2300/0452; G09G 2300/043; G09G 2300/0443; G09G 3/3674; G09G 2320/0666; H01L 27/1255; H01L 27/124; H01L 29/42356; H01L 27/1225; H01L 29/41733; H01L 29/78669
See application file for complete search history.

(56) References Cited

U.S. PATENT DOCUMENTS

| | | | |
|---|---|---|---|
| 2004/0080679 A1* | 4/2004 | Song | G02F 1/136227 349/43 |
| 2010/0073273 A1 | 3/2010 | Nam et al. | |
| 2013/0215344 A1 | 8/2013 | Kim et al. | |
| 2016/0147119 A1 | 5/2016 | Chang et al. | |
| 2016/0313613 A1 | 10/2016 | Chang et al. | |
| 2019/0296048 A1 | 9/2019 | Lee et al. | |
| 2019/0355318 A1 | 11/2019 | Park et al. | |

FOREIGN PATENT DOCUMENTS

| | | | | |
|---|---|---|---|---|
| KR | 10-1641538 B1 | 7/2016 | | |
| KR | 10-2017-0039000 A | 4/2017 | | |
| WO | WO-2007114471 A1 * | 10/2007 | ....... | G02F 1/133512 |
| WO | WO-2012093621 A1 * | 7/2012 | ....... | G02F 1/136213 |

* cited by examiner

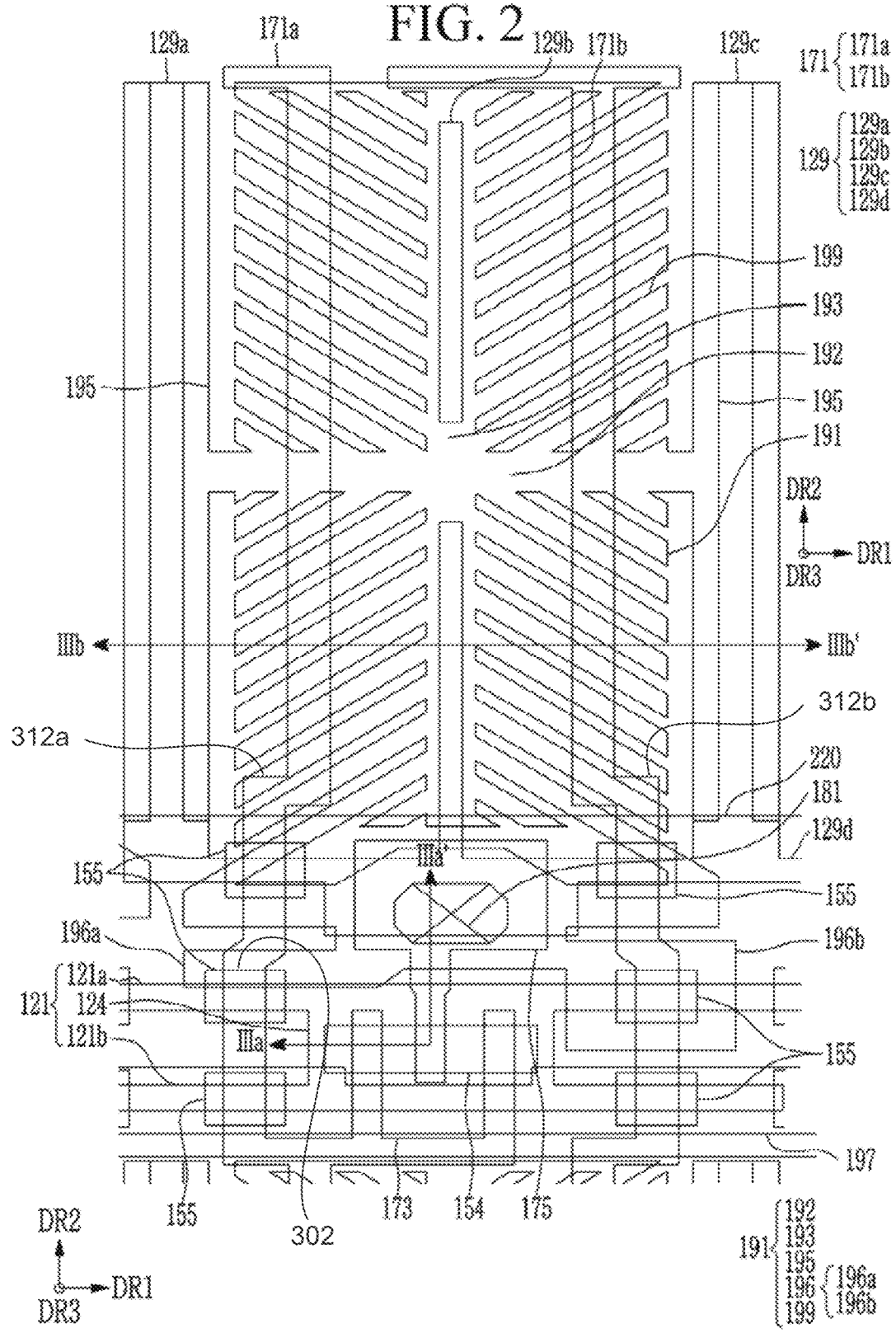

DISPLAY DEVICE

CROSS-REFERENCE TO RELATED APPLICATION

This application is a divisional application of U.S. patent application Ser. No. 16/802,442, filed on Feb. 26, 2020, now U.S. Pat. No. 11,226,527, which claims priority to and the benefit of Korean Patent Application No. 10-2019-0050337 filed in the Korean Intellectual Property Office on Apr. 30, 2019, the entire contents of which are incorporated herein by reference.

BACKGROUND

(a) Technical Field

The present disclosure relates to a display device, and in detail, relates to a display device for differentiating a capacitance for each region of the display device.

(b) Description of the Related Art

A liquid crystal display is a flat panel display that is widely used and includes two display panel sheets in which field generating electrodes such as pixel electrodes and common electrodes are formed, and a liquid crystal layer interposed between the display panels. A voltage is applied to the field generating electrodes to generate an electric field in the liquid crystal layer, which determines the direction of liquid crystal molecules of the liquid crystal layer, and an image is displayed by controlling the polarization of incident light.

The liquid crystal display also includes a switching element connected to each pixel electrode, and a plurality of signal lines such as a gate line and a data line for applying a voltage to the pixel electrode by controlling the switching element.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments provide a display device capable of compensate a luminance difference by a data voltage.

A display device according to an embodiment of the present inventive concept includes: a substrate including a first region and a second region; and a plurality of pixels disposed on the substrate, wherein the plurality of pixels each include a first data line and a second data line overlapping a pixel electrode, a first capacitance between the first data line and the pixel electrode is smaller than a second capacitance between the second data line and the pixel electrode in a pixel disposed in the first region, and the first capacitance between the first data line and the pixel electrode is larger than the second capacitance between the second data line and the pixel electrode in a pixel disposed in the second region.

The display panel may be scanned in a direction from the first region to the second region.

The plurality of pixels may each include: a gate line disposed on the substrate; a data line disposed to be insulated from the gate line; the pixel electrode disposed to overlap the first data line and the second data line; and a pixel electrode protrusion connected to the pixel electrode, wherein the data line may include the first data line and the second data line, and the pixel disposed in the first region may include a second pixel electrode protrusion overlapping the second data line.

An area of the first pixel electrode protrusion overlapping the first data line in the pixel disposed in the second region may be wider than an area of the first pixel electrode protrusion overlapping the first data line of the pixel disposed in the first region.

The first data line may be electrically connected to the pixel electrode of the pixel, and the second data line may not be electrically connected to the pixel electrode that is electrically connected to the first data line.

The pixel may include a display area and a light blocking area, and in the light blocking area of the pixel disposed in the first region, a width of the first data line may be narrower than a width of the second data line.

In the light blocking area of the pixel disposed in the second region, a width of the first data line may be wider than a width of the second data line.

A plurality of semiconductor layers disposed between the gate line and the data line may be further included, and the plurality of semiconductor layers may each include a dummy semiconductor layer disposed at a region where the gate line and the data line cross each other.

The gate line may include a first gate line and a second gate line parallel to each other, and a gate electrode disposed between the first gate line and the second gate line, and a part of the plurality of semiconductor layers, may be disposed to overlap the gate electrode so as to configure a transistor.

The first data line and the second data line may be curved at one edge of the pixel electrode, and a curved length of the second data line may be longer than a curved length of the first data line.

A storage electrode line disposed on the same layer as the gate line may be further included, the storage electrode line may include a first storage electrode line, a second storage electrode line, and a third storage electrode line, the first storage electrode line may be disposed to be adjacent to one edge of the pixel electrode, the third storage electrode line may be disposed to be adjacent to another edge of the pixel electrode, and the second storage electrode line may be disposed to overlap the center of the pixel electrode.

The first data line may be disposed between the first storage electrode line and the second storage electrode line, and the second data line may be disposed between the second storage electrode line and the third storage electrode line.

A display device according to another embodiment of the present inventive concept includes: a substrate including a first region and a second region; and a plurality of pixels disposed on the substrate, wherein the plurality of pixels each include a first data line and a second data line overlapping a pixel electrode, in a pixel disposed in the first region, a first capacitance between the first data line and the pixel electrode is smaller than a second capacitance between the second data line and the pixel electrode, and a difference between the first capacitance and the second capacitance in the first region decreases stepwise closer to the second region.

In the pixel disposed in the second region, a first capacitance between the first data line and the pixel electrode may be larger than a second capacitance between the second data line and the pixel electrode, and in the second region, a difference between the first capacitance and the second capacitance may increase stepwise farther away from the first region.

The first capacitance and the second capacitance may be equal in the center region of the substrate.

The plurality of pixels may each include: a gate line disposed on the substrate; a data line disposed to be insulated from the gate line; a pixel electrode disposed to overlap the first data line and the second data line; and a pixel electrode protrusion connected to the pixel electrode, wherein the data line may include the first data line and the second data line, the pixel disposed in the first region may include a second pixel electrode protrusion overlapping the second data line, and the area of the first pixel electrode protrusion overlapping the first data line in the pixel disposed in the second region may be larger than the area of the first pixel electrode protrusion overlapping the first data line of the pixel disposed in the first region.

The pixel may include a display area and a light blocking area, and in the pixel disposed in the first region, the width of the first data line may be narrower than the width of the second data line in the light blocking area, while in the pixel disposed in the second region, the width of the first data line may be wider than the width of the second data line in the light blocking area.

The first data line may be electrically connected to the pixel electrode of the pixel, and the second data line may not be electrically connected to the pixel electrode that is electrically connected to the first data line.

A display device according to another embodiment of the present inventive concept includes: a substrate including a first region and a second region; and a plurality of pixels disposed on the substrate, wherein the pixels include a first data line and a second data line overlapping a pixel electrode, a pixel disposed in the first region includes a second pixel electrode protrusion overlapping the second data line, and an area of the first pixel electrode protrusion overlapping the first data line in the pixel disposed in the second region is larger than an area of the first pixel electrode protrusion overlapping the first data line of the pixel disposed in the first region.

A display device according to another embodiment of the present inventive concept includes: a substrate including a first region and a second region; and a plurality of pixels disposed on the substrate, wherein the plurality of pixels each include a first data line and a second data line overlapping a pixel electrode, the pixels include a display area and a light blocking area, in the pixel disposed in the first region, a width of the first data line is narrower than a width of the second data line in the light blocking area, and in a pixel disposed in the second region, a width of the first data line is wider than a width of the second data line in the light blocking area.

According to the embodiments, a display device capable of compensating a luminance difference by a data voltage is provided.

BRIEF DESCRIPTION OF THE DRAWINGS

FIG. 2 is a layout view of one pixel disposed in a first region A1.

FIG. 6A shows a measuring position, and FIG. 6B is an image for measuring a luminance at a measuring position.

FIG. 7A shows a measuring position, and FIG. 7B is an image for measuring a luminance at a measuring position. FIG. 7C shows a luminance for each position for the same cross-section as in FIG. 3B. FIG. 7D shows a reason that a luminance is high near a first data line and a luminance is low near a second data line.

FIG. 8A is a view showing a brightness in an upper end and a lower end of a white box when a self-capacitance is larger than a neighboring-capacitance. FIG. 8B is a view showing a voltage behavior in an upper end of a white box. FIG. 8C is a view showing a voltage behavior in a lower end of a white box.

FIG. 9A is a view showing a brightness in an upper end and a lower end of a white box when a self-capacitance is smaller than a neighboring-capacitance. FIG. 9B is a view showing a voltage behavior in an upper end of a white box. FIG. 9C is a view showing a voltage behavior in a lower end of a white box.

DETAILED DESCRIPTION OF THE EMBODIMENTS

Figure 1:
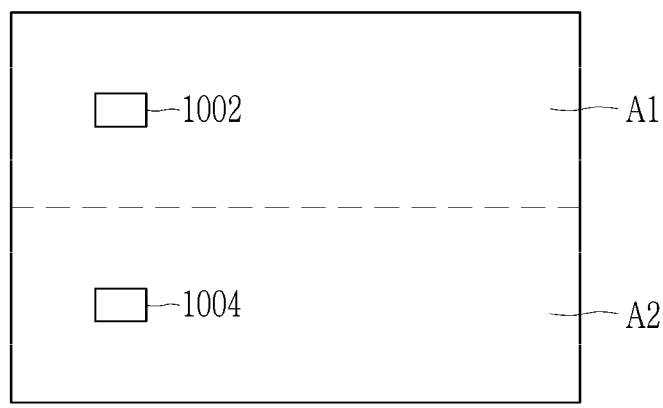
FIG. 1 is a view schematically showing a display device according to an embodiment of the present inventive concept.

The present inventive concept will be described more fully hereinafter with reference to the accompanying drawings, in which embodiments of the invention are shown. As those skilled in the art would realize, the described embodiments may be modified in various different ways, all without departing from the spirit or scope of the present inventive concept.

In order to clearly explain the present inventive concept, portions that are not directly related to the present inventive concept are omitted, and the same reference numerals are attached to the same or similar constituent elements through the entire specification.

In addition, the size and thickness of each configuration shown in the drawings are arbitrarily shown for better understanding and ease of description, but the present inventive concept is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Now, a display device according to an embodiment of the present inventive concept is described in detail with reference to accompanying drawings.

FIG. 1 is a view schematically showing a display device 1000 according to an embodiment of the present inventive concept. Referring to FIG. 1, the display device 1000 according to an embodiment of the present inventive concept includes a first region A1 and a second region A2. As shown in FIG. 1, the first region A1 and the second region A2 are disposed at opposite sides with respect to a center in a second direction DR2 of the display device 1000. A scan is performed in a direction from the first region A1 to the second region A2. As is described in detail later, capacitances Cdp between a data line and a pixel electrode in the first region A1 and the second region A2 are different from each other.

That is, in one pixel of the display device according to the present embodiment, the pixel electrode overlaps two data lines. In this case, one data line is the data line connected to a corresponding pixel (hereinafter, a first data line), and the other data line is the data line connected to a neighboring pixel (hereinafter, a second data line).

In the pixel disposed at the first region A1, the capacitance between the first data line and the pixel electrode (hereinafter, a self-capacitance Cdp1) is smaller than the capacitance between the second data line and the pixel electrode (hereinafter, a neighboring-capacitance Cdp2).

Also, in the pixel disposed in the second region A2, the self-capacitance Cdp1 is larger than the neighboring-capacitance Cdp2. By differentiating the self-capacitance Cdp1 and the neighboring-capacitance Cdp2 of each pixel for each region of the display device, the luminance deviation due to the data voltage may be compensated. Detailed effects are described in detail later.

The pixels disposed in the first region A1 and the second region A2 are described in detail with reference to the drawings.

In this specification, the meaning of the pixel includes the area occupied by one transistor and the pixel electrode 2 connected thereto, and FIG. 2 shows one pixel.

Figure 3A:
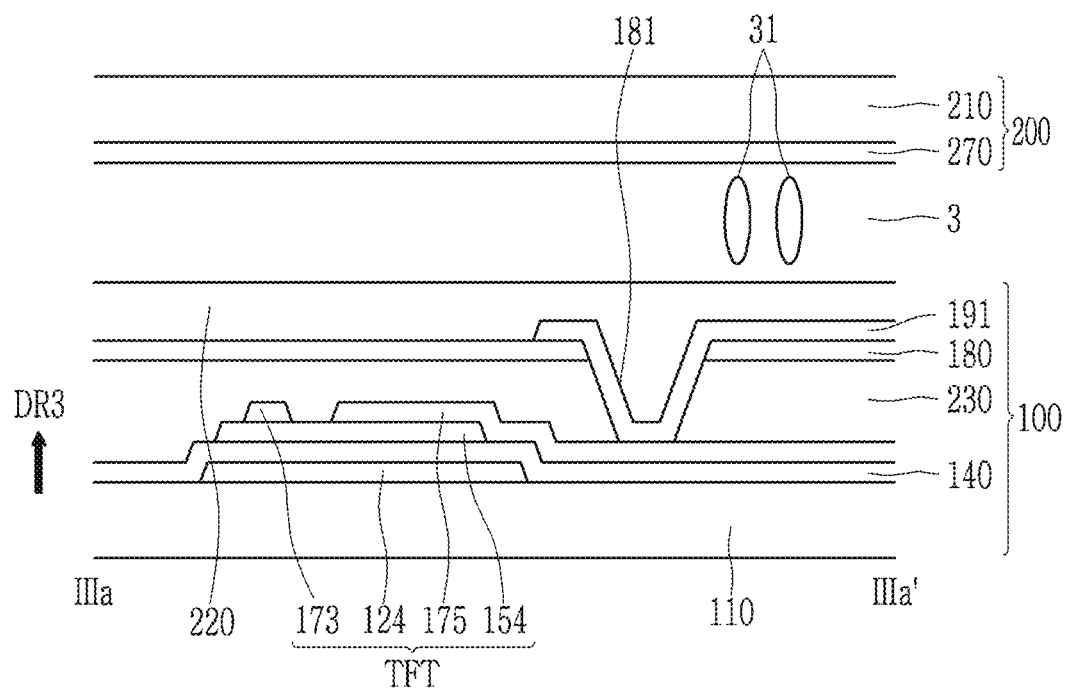
FIG. 3A is a cross-sectional view of a display device of FIG. 2 taken along a line IIIa-IIIa'.
Figure 3B:
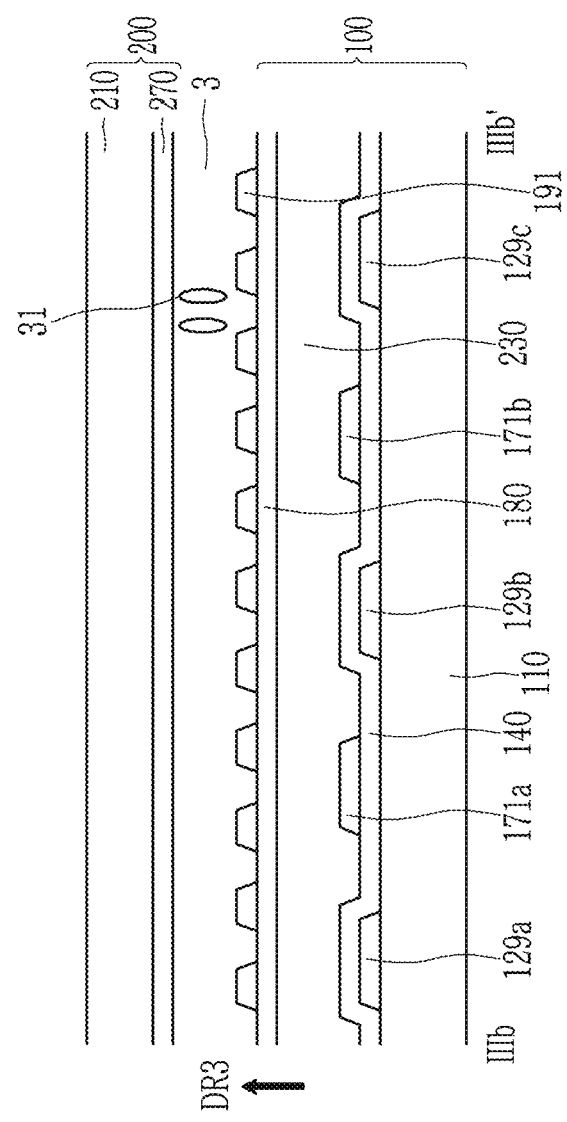
FIG. 3B is a cross-sectional view of a display device of FIG. 2 taken along a line IIIb-IIIb'.

FIG. 2 is a layout view of one pixel 1002 disposed in a first region A1 of FIG. 1. FIG. 3A is a cross-sectional view of a display device of FIG. 2 taken along a line IIIa-IIIa'. FIG. 3B is a cross-sectional view of a display device of FIG. 2 taken along a line IIIb-IIIb'.

Referring to FIG. 2 and FIG. 3A, a plurality of gate lines 121 disposed on a first substrate 110 made of transparent glass or plastic are included.

The gate lines 121 transmit a gate signal and extend in a first direction DR1. Each gate line 121 includes a first gate line 121a and a second gate line 121b that are separated from each other, and a gate electrode 124 connecting the first gate line 121a and the second gate line 121b.

Also, a storage electrode line 129 may be disposed on the same layer as the gate line 121. The storage electrode line 129 includes a first storage electrode line 129a, a second storage electrode line 129b, and a third storage electrode line 129c extending in the second direction DR2, and the first storage electrode line 129a, the second storage electrode line 129b, and the third storage electrode line 129c are connected to a transverse storage electrode line 129d extending parallel to the first direction DR1. The second storage electrode line 129b may include two parts that are separated from each other, and the second storage electrode line 129b that is not connected to the transverse storage electrode line 129d may be disposed with an island shape.

A gate insulating layer 140 made of an insulating material such as a silicon oxide or a silicon nitride is disposed on the gate line 121 and the storage electrode line 129. The gate insulating layer 140 may have a multilayered structure including at least two insulating layers having different physical properties.

A plurality of semiconductor layers 154 are disposed on the gate insulating layer 140. The semiconductor layer 154 may be disposed overlapping the gate electrode 124. Also, dummy semiconductor layers 155 disposed on the same layer as the semiconductor layer 154 may be disposed at a position where the gate line 121 and the data line 171 are crossed and a position where the storage electrode line 129 and the data line 171 are crossed. These dummy semiconductor layers 155 smooth a step at the region where the wires are crossed. However, the dummy semiconductor layer 155 does not constitute a transistor or the like.

Next, a plurality of data lines 171, a plurality of source electrodes 173 connected to the data lines 171, and a plurality of drain electrodes 175 are disposed on the semiconductor layer 154 and the gate insulating layer 140.

The data line 171 extends in the second direction DR2, thereby crossing the gate line 121. The data line 171 includes a first data line 171a and a second data line 171b. The first data line 171a and the second data line 171b overlap the pixel electrode 191, and are disposed without overlapping the storage electrode line 129.

In detail, the first data line 171a may be disposed between the first storage electrode line 129a and the second storage electrode line 129b. Also, the second data line 171b may be disposed between the second storage electrode line 129b and the third storage electrode line 129c.

The first data line 171a each constitutes a respective transistor of the overlapping pixels. However, the second data line 171b constitutes the transistors of other pixels (not shown) neighboring in the second direction. That is, in the present embodiment, two data lines overlap one pixel electrode 191, but only one data line 171a is electrically connected to the pixel electrode 191 and the other data line 171b is electrically connected to the pixel electrode neighboring thereto.

The second data line 171b may be disposed to be curved and/or bent near the edge of the pixel electrode 191 in the second direction DR2. The first data line 171a may be also disposed to be curved near the edge of the pixel electrode 191 in the second direction DR2. At this time, the curved length of the second data line 171*b* may be longer than the curved length of the first data line 171*a* (e.g., the length of the bent portion of the second data line 171*b* may be longer than the bent portion of the first data line 171*a*).

A portion of the first data line 171*a* constitutes the source electrode 173. The source electrode 173 extends from the data line 171 and overlaps the gate electrode 124, and may have an approximate U-shape. The drain electrode 175 is separated from the data line 171, and extends from the center of the U-shape of the source electrode 173 toward the top.

One gate electrode 124, one source electrode 173, and one drain electrode 175 form one thin film transistor (TFT) together with the semiconductor layer 154, and the channel region of the thin film transistor is formed in the semiconductor layer 154 between the source electrode 173 and the drain electrodes 175.

Next, a plurality of color filters 230 are disposed on the data line 171. The color filters may include a red color filter, a green color filter, and a blue color filter. Each color filter may be located in the region corresponding to one pixel electrode 191.

Next, an insulating layer 180 is disposed. The insulating layer 180 may be made of an inorganic insulator such as a silicon nitride or a silicon oxide, an organic insulator, or a low dielectric constant insulator.

The insulating layer 180 and the color filter 230 include a contact hole 181 overlapping the drain electrode 175. The pixel electrode 191 is physically and electrically connected to the drain electrode 175 through the contact hole 181, thereby receiving the data voltage from the drain electrode 175.

The pixel electrode 191 may include a transparent conductor such as ITO or IZO. The pixel electrode includes a transverse stem part 192 extending in the first direction DR1, and a longitudinal stem part 193 crossing the transverse stem part and extending in the second direction DR2. Fine branches 199 extend from each stem part.

The pixel electrode 191 overlaps both the first storage electrode line 129*a* and the third storage electrode line 129*c*, and includes an outer longitudinal stem part 195 extending along the second direction DR2. The outer longitudinal stem part 195 is connected to the edge of the transverse stem part 192 of the pixel electrode 191.

The pixel electrode 191 also includes an outer transverse stem part 196. The outer transverse stem part 196 is disposed adjacent to the transistor TFT, and a part of the outer transverse stem part 196 is connected to the drain electrode 175 through the contact hole 181, thereby receiving the voltage.

A part of the outer transverse stem part 196 includes a first protrusion 196*a* that overlaps the first data line 171*a* and a second protrusion 196*b* that overlaps the second data lines. The first data line 171*a* and the first protrusion 196*a* overlapping each other form a self-capacitance Cdp1. The second data line 171*b* and the second protrusion 196*b* overlapping each other constitute the neighboring-capacitance Cdp2.

Referring to FIG. 1, the area of the second protrusion 196*b* is larger than the area of the first protrusion 196*a*. Therefore, the value of the neighboring-capacitance Cdp2 between the second protrusion 196*b* and the second data line 171*b* is larger than the value of the self-capacitance Cdp1. In the pixel disposed in the first region A1 of the display device, as shown in FIG. 2, the value of the neighboring-capacitance Cdp2 is larger than the value of the self-capacitance Cdp1 such that the luminance deviation due to the data voltage may be compensated. Specific effects will be described later.

Referring to FIG. 2, an overlapping pixel electrode 197 overlapping the part of the gate line 121 is included. The overlapping pixel electrode 197 may extend along the first direction DR1.

Next, referring to FIG. 2 and FIG. 3A, a light blocking member 220 is disposed on the pixel electrode 191. The light blocking member 220 is disposed along the first direction DR1, and overlaps the transistor and the gate line 121 and the like. In FIG. 2, the region overlapping the light blocking member 220 is referred to as a light blocking area, and the region not overlapping the light blocking member 220 is referred to as a display area.

Next, referring to FIG. 3A, a common electrode 270 is disposed on a second substrate 210. A liquid crystal layer 3 including liquid crystal molecules 31 is disposed between a first display panel 100 and a second display panel 200.

FIG. 3B shows another cross-section of FIG. 2. Referring to FIG. 3B, the first storage electrode line 129*a*, the second storage electrode line 129*b*, and the third storage electrode line 129*c* are disposed to be separated from each other on the first substrate 110, and the first data line 171*a* and the second data line 171*b* are disposed therebetween. The description of the other constituent elements is the same as that in FIG. 3A such that the detailed explanations of the same constituent elements are omitted.

Figure 4:
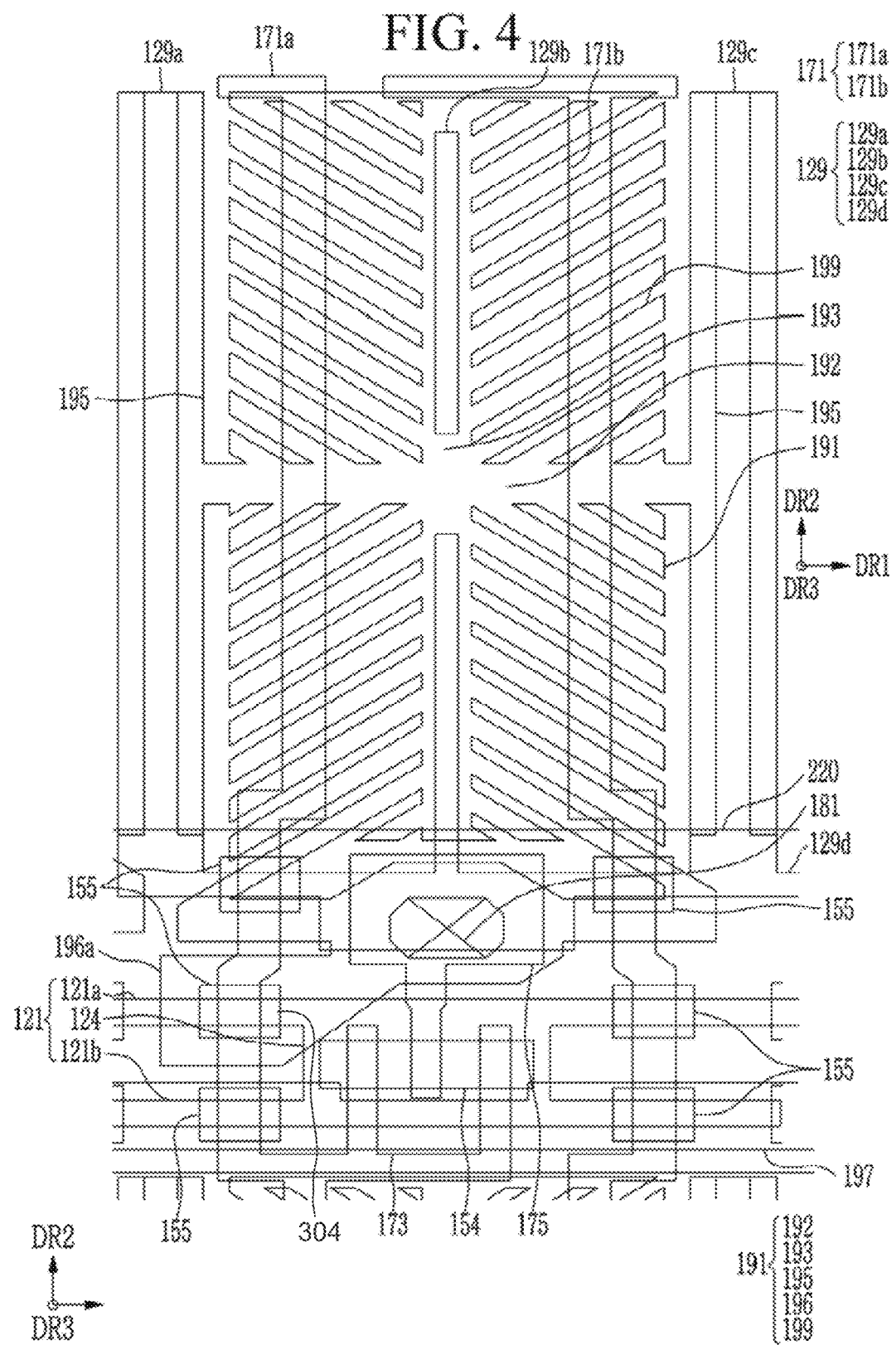
FIG. 4 is a layout view of one pixel disposed in a second region A2.

Next, the arrangement of one pixel 1004 disposed in the second region A2 of FIG. 1 is described with reference to FIG. 4. FIG. 4 is a layout view of one pixel disposed in the second region A2. Referring to FIG. 4, the arrangement of the pixel disposed in the second region A2 is the same as that in FIG. 2 except for the configuration related to the first protrusion 196*a* of the outer transverse stem part 196. The detailed description of the same constituent elements is omitted.

Referring to FIG. 4, in the pixel according to the present embodiment, the outer transverse stem part 196 only incudes the first protrusion 196*a* without the second protrusion. Therefore, the first protrusion 196*a* and the first data line 171 form the self-capacitance Cdp1, and the value of the self-capacitance Cdp1 becomes larger than the value of the neighboring-capacitance Cdp2. In the present embodiment, the second protrusion is not disposed. However, the outer transverse stem part 196 and the second data line 171*b* are partially overlapped, thereby forming the neighboring-capacitance Cdp2 in the overlapping region. However, because the second data line 171*b* does not include the configuration corresponding to the first protrusion 196*a* overlapping the first data line 171*a*, the self-capacitance Cdp1 is larger than the neighboring-capacitance Cdp2.

Also, the area of the first protrusion 196*a* of FIG. 4 is larger than the area of the first protrusion 196*a* of FIG. 2. The first protrusion 196*a* of FIG. 2 is the structure disposed to compensate the capacitance by the curved part of the second data line 171*b* because the second data line 171*b* is curved near the edge of the pixel electrode 191 in the second direction DR2. Accordingly, in the pixel of FIG. 4, the area of the first protrusion 196*a* should be larger than that in the pixel of FIG. 2, and in this case, the self-capacitance Cdp1 becomes larger than the neighboring-capacitance Cdp2.

That is, in the display device according to the present embodiment, the pixel disposed in the first region A1 further includes the second protrusion overlapping the second data line such that the neighboring-capacitance Cdp2 is larger than the self-capacitance Cdp1, and in the pixel disposed in the second region A2, the area of the first protrusion overlapping the first data line is further wider without including the second protrusion, such that the self-capacitance Cdp1 is larger than the neighboring-capacitance Cdp2. Thus, since the sizes of the self-capacitance Cdp1 and the neighboring-capacitance Cdp2 are different from each other, the luminance deviation due to the data voltage may be compensated.

Figure 5:
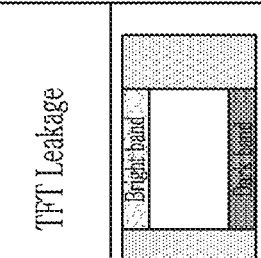
FIG. 5 shows various causes that affect a luminance and results in a display device.

FIG. 5 shows various causes that affect a luminance and results in a display device. Referring to FIG. 5, when displaying an image in which a white box is disposed at the center, if the self-capacitance Cdp1 is large, the image appears bright at the top of the white box and dark at the bottom. Conversely, if the self-capacitance Cdp1 decreases, the image appears dark at the top of the white box and bright at the bottom.

The luminance of the display device is also affected by TFT leakage and the data voltage. Particularly, in the display device according to the present embodiment, since the data line 171 and the pixel electrode 191 are overlapped in the display area, the effect of the luminance due to the data voltage is great. Referring to FIG. 5, the change in the luminance due to the data voltage appears bright at the top and bottom of the white box.

Thus, the data voltage causes a problem that the display device is visibly brighter at the top and bottom of the white box. However, in the display device according to the present embodiment, the self-capacitance Cdp1 is made smaller than the neighboring-capacitance Cdp2 at the top of the white box, that is, at the top of the display device, so that the display device is recognized to be darkened, thereby compensating the luminance brightened by the data voltage. Also, the self-capacitance Cdp1 is made larger than the neighboring-capacitance Cdp2 at the bottom of the white box, that is, at the bottom of the display device, so that the display device is recognized to be darkened, thereby compensating the luminance brightened by the data voltage.

Figure 6A:
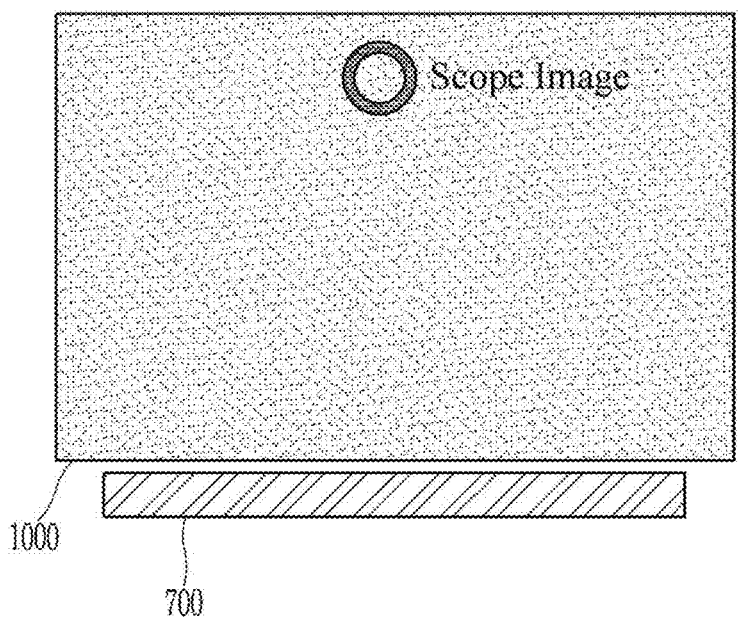
FIGS. 6A and 6B are views for measuring a luminance of a display device when displaying an image without a white box.
Figure 6B:
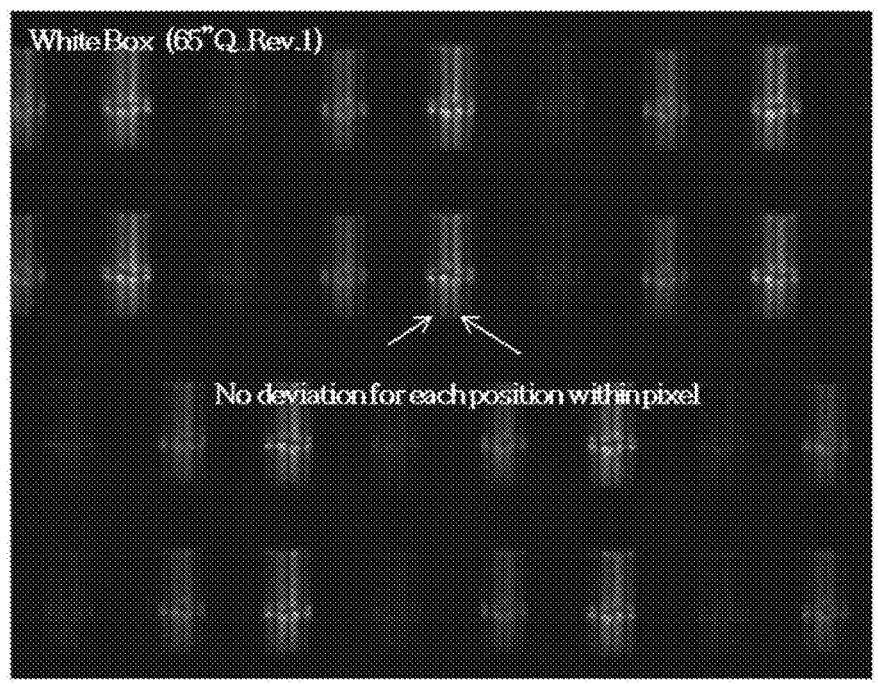

FIGS. 6A and 6B are views for measuring a luminance of a display device when displaying an image without a white box. FIG. 6A shows a measuring position, and FIG. 6B is an image for measuring a luminance at a measuring position. FIG. 6A shows a display panel 1000 and a pad 700. Referring to FIG. 6B, it is confirmed that there is no luminance deviation according to the position in the pixel in the image without the white box.

Figure 7A:
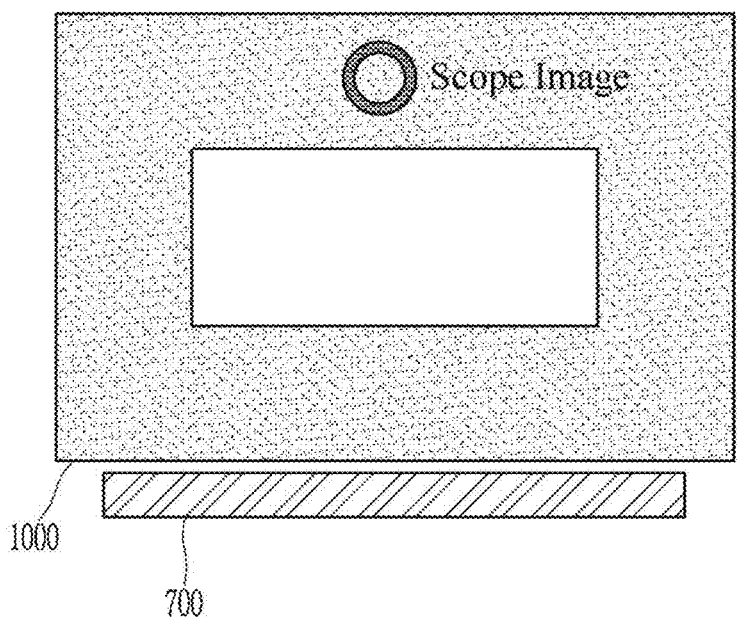
FIGS. 7A, 7B, 7C, and 7D are views for measuring a luminance of a display device when displaying an image including a white box.
Figure 7B:
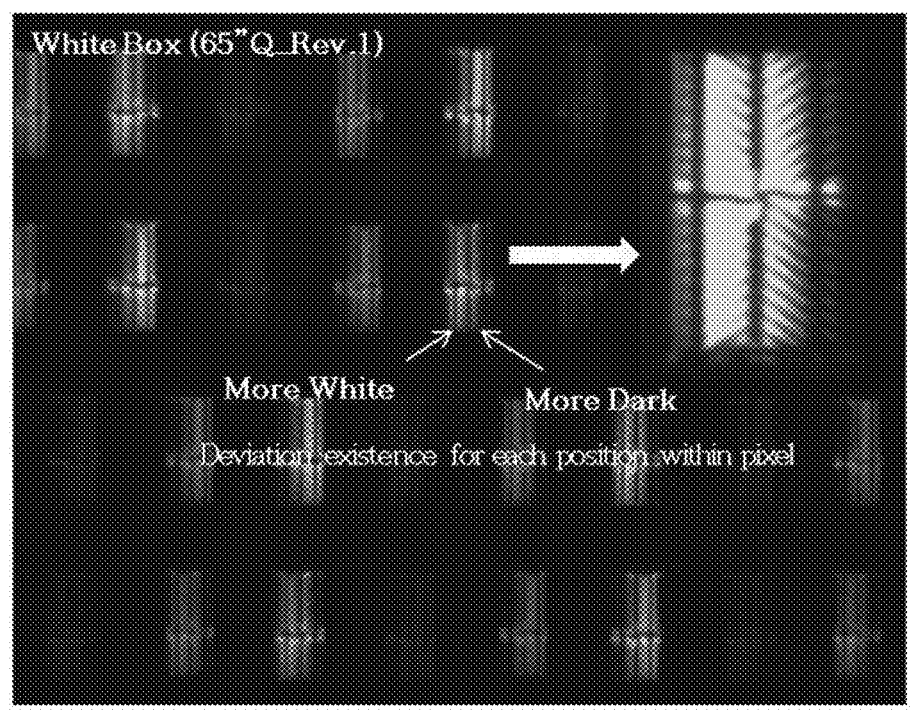
Figure 7C:
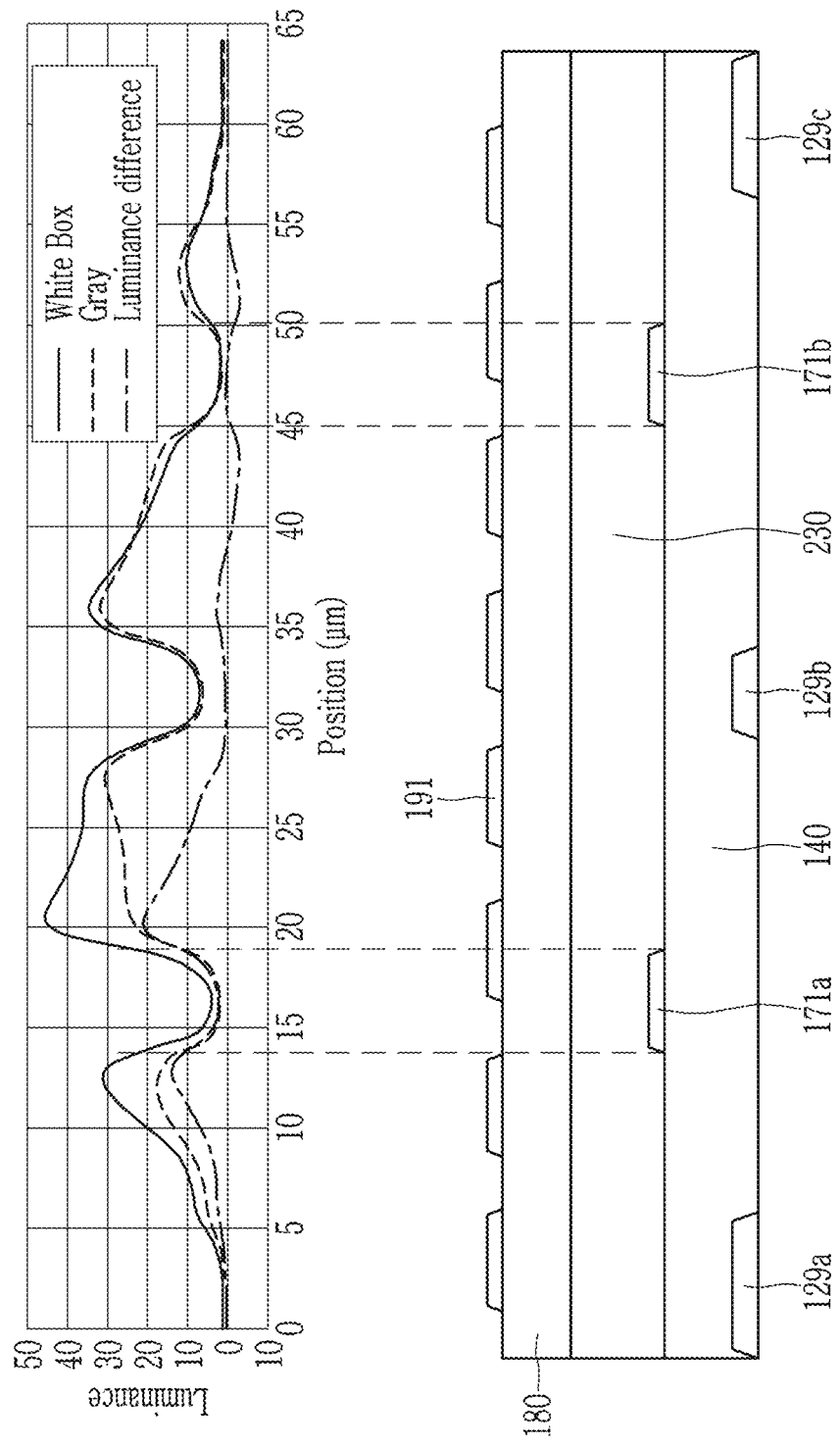

FIGS. 7A, 7B, 7C, and 7D are views for measuring a luminance of a display device when displaying an image including a white box. FIG. 7A shows a measuring position, and FIG. 7B is an image for measuring a luminance at a measuring position. FIG. 7A shows the display panel 1000 and the pad 700. Referring to FIG. 7B, in the case of the image including the white box, it may be confirmed that the luminance deviation appears for each position in the pixel. FIG. 7C shows a luminance for each position for the same cross-section as in FIG. 3B. Referring to FIG. 7C, it may be confirmed that the luminance is high near the first data line 171a which is electrically connected to the pixel electrode 191, and the luminance is low near the second data line 171b which is not electrically connected to the pixel electrode 191.

Figure 7D:
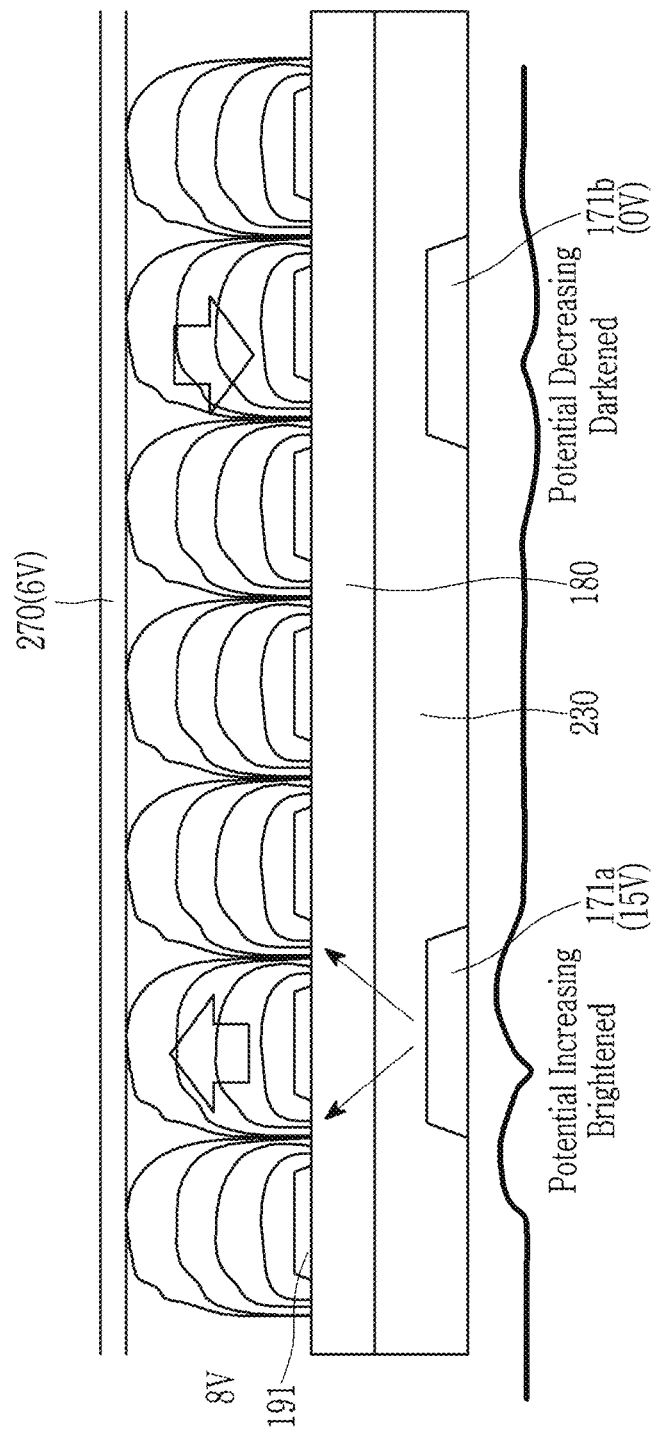

FIG. 7D shows a reason why a luminance is high near the first data line 171a and a luminance is low near the second data line 171b. Referring to FIG. 7D, potential increases near the first data line 171a connected to the pixel electrode to supply a data voltage of 15 V such that the luminance is high. However, the potential decreases near the second data line 171b to which the data voltage is not supplied during the driving of the corresponding pixel that is connected to the neighboring pixel electrode, and accordingly, the luminance is lower.

Figure 8A:
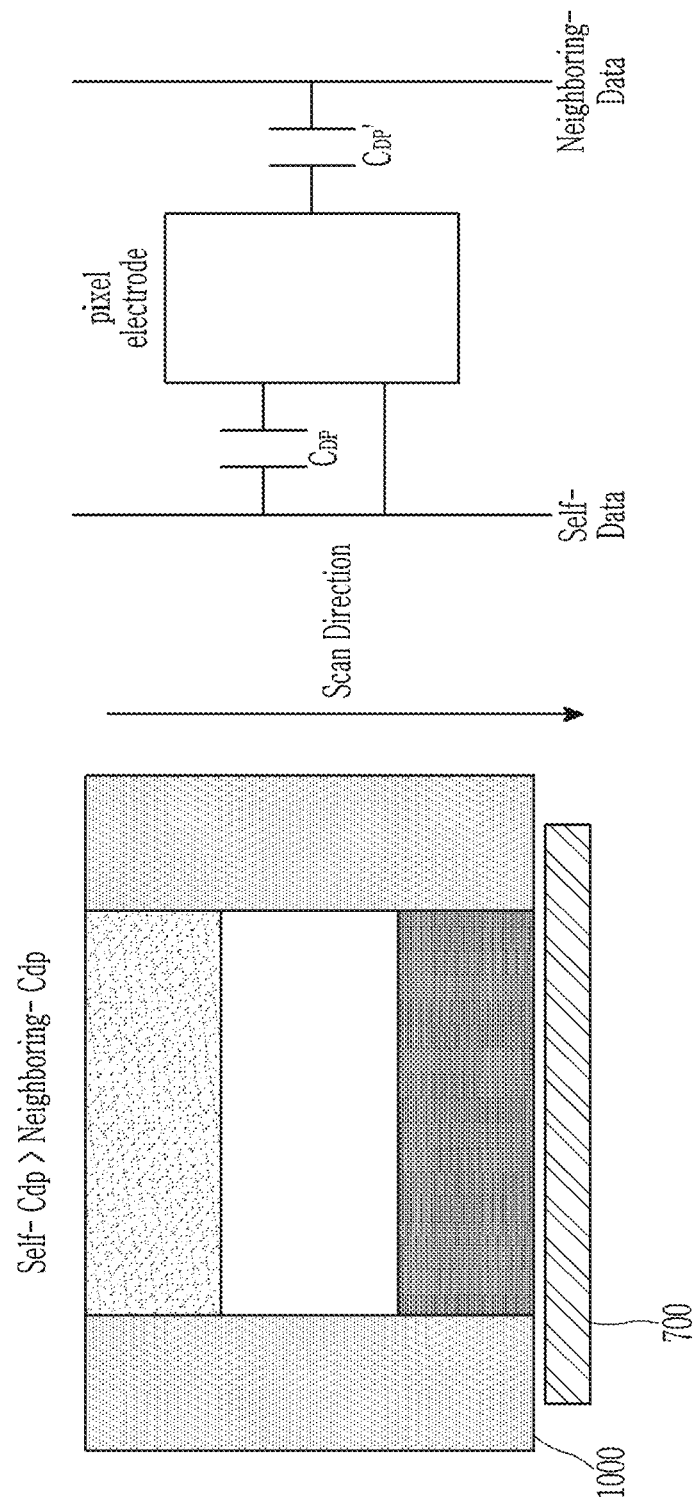
FIGS. 8A, 8B, and 8C are views showing a luminance in upper and lower regions of a white box of a display device when a self-capacitance is larger than a neighboring-capacitance.
Figure 8B:
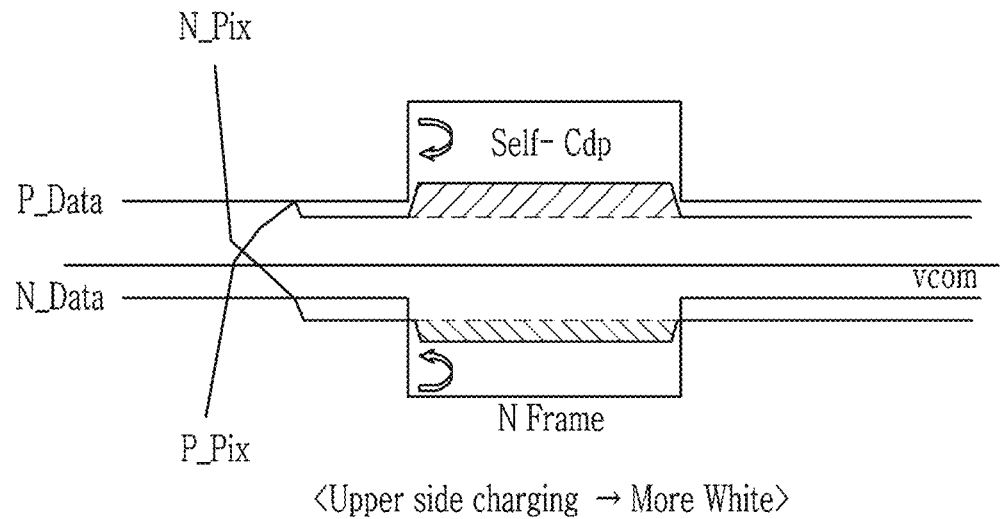
Figure 8C:
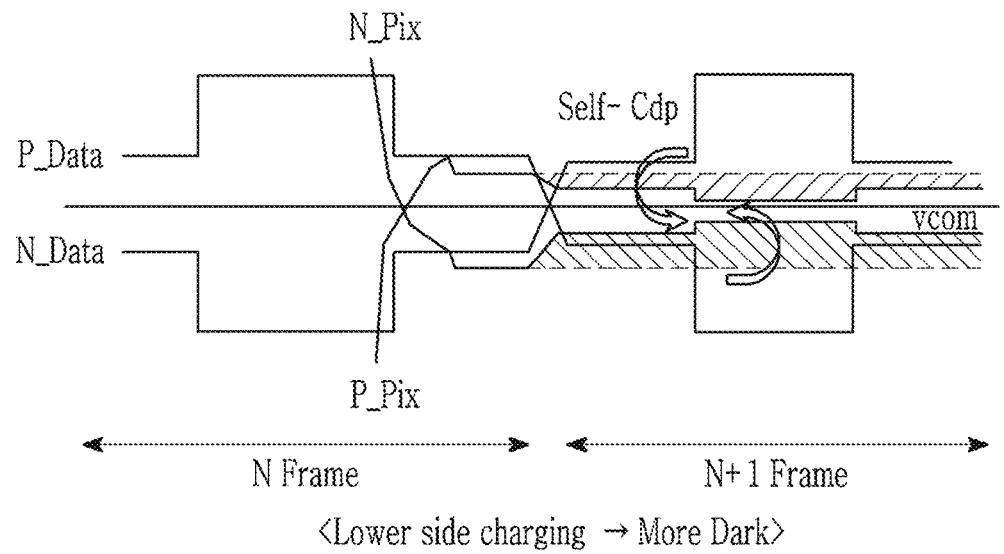

FIGS. 8A, 8B, and 8C are views showing a luminance in an upper and lower region of a white box of a display device when a self-capacitance Cdp1 is larger than a neighboring-capacitance Cdp2. FIG. 8A is a view showing a brightness in an upper end and a lower end of a white box when a self-capacitance Cdp1 is larger than a neighboring-capacitance Cdp2. FIG. 8A shows the display panel 1000 and the pad 700. Referring to FIG. 8A, the top of the white box appears lighter, and the bottom of the white box appears darker. FIG. 8B is a view showing a voltage behavior in an upper end of a white box. As shown in FIG. 8B, at the top of the white box, the image appears bright because the data voltages are driven in the direction away from each other. FIG. 8C shows the voltage behavior at the bottom of the white box. As shown in FIG. 8C, at the bottom of the white box, the data voltages are driven in the direction toward each other such that the image appears dark.

Figure 9A:
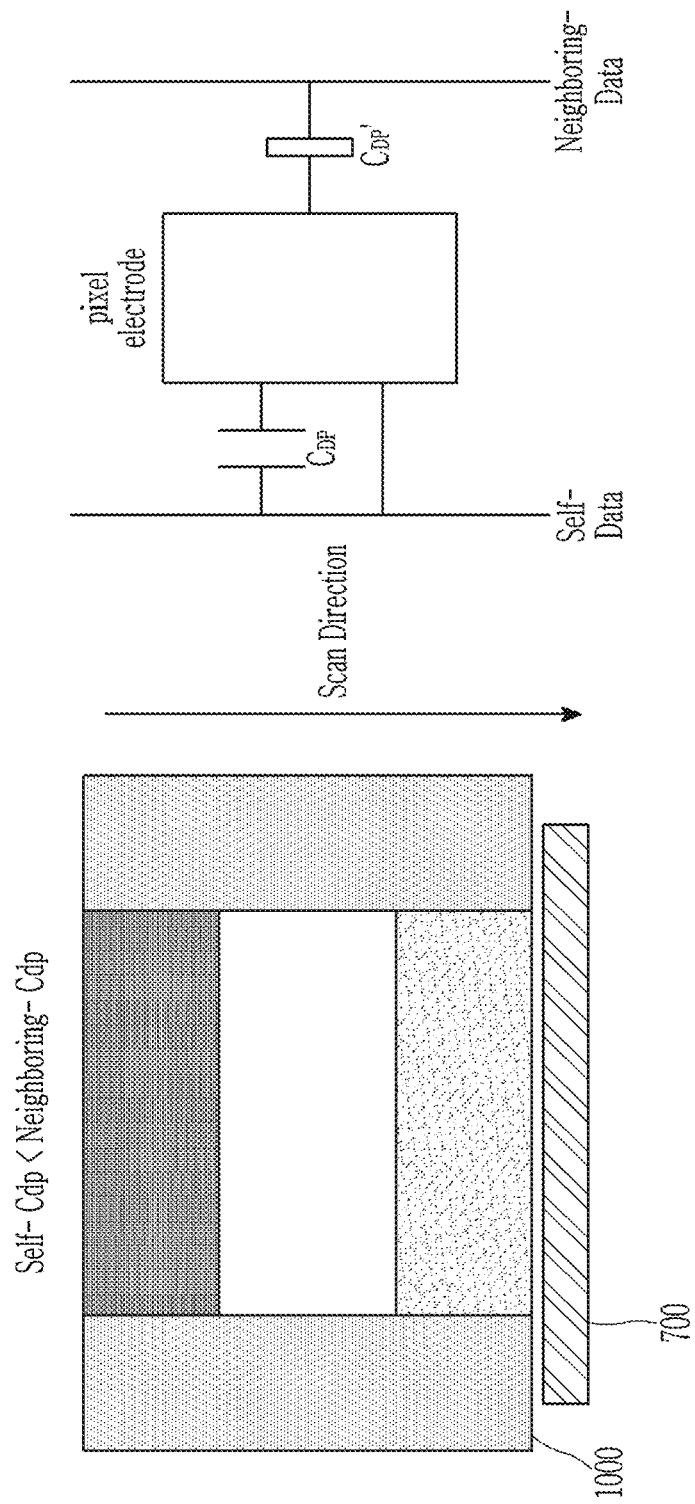
FIGS. 9A, 9B, and 9C are views showing a luminance in upper and lower regions of a white box of a display device when a self-capacitance is smaller than a neighboring-capacitance.
Figure 9B:
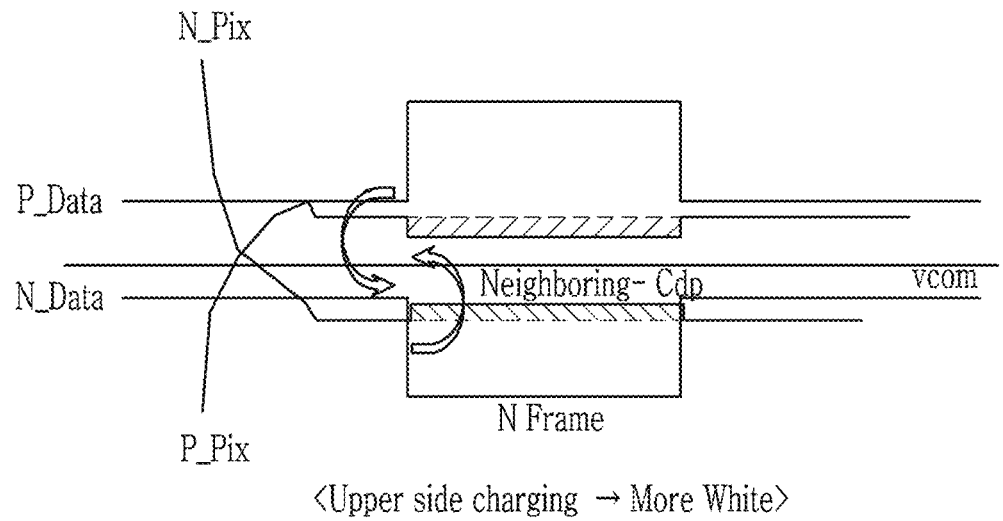
Figure 9C:
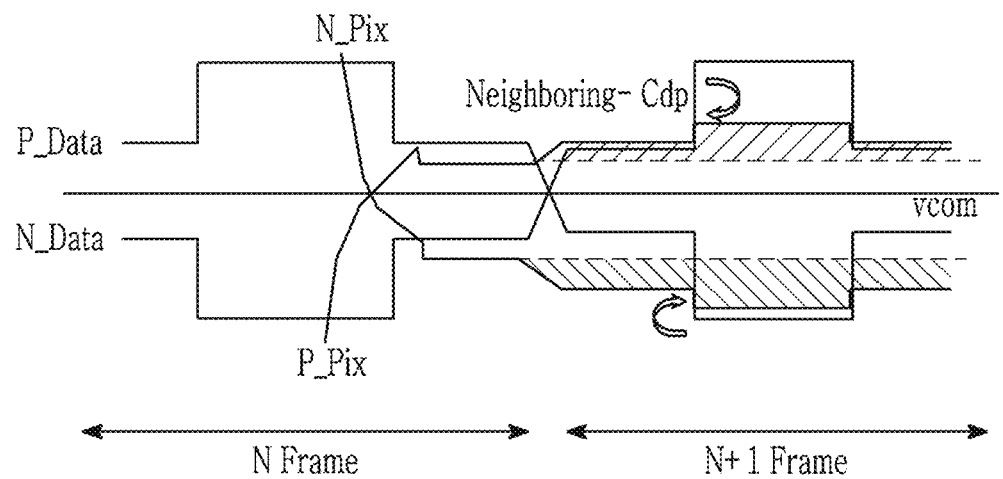

FIGS. 9A, 9B, and 9C are views showing a luminance in an upper and lower region of a white box of a display device when a self-capacitance Cdp1 is smaller than a neighboring-capacitance Cdp2. FIG. 9A is a view showing a brightness in an upper end and a lower end of a white box when a self-capacitance Cdp1 is smaller than a neighboring-capacitance Cdp2. FIG. 9A shows the display panel 1000 and the pad 700. Referring to FIG. 9A, the top of the white box appears darker, and the bottom of the white box appears lighter. FIG. 9B is a view showing a voltage behavior in an upper end of a white box. As shown in FIG. 9B, at the top of the white box, the image appears dark because the data voltages are driven in the direction approaching each other. FIG. 9C is a view showing a voltage behavior in a lower end of a white box. As shown in FIG. 9C, at the bottom of the white box, the image appears dark because the data voltages are driven in the direction away from each other.

That is, in the display device according to the present embodiment, by using a phenomenon that the luminance at the upper and lower ends of the white box varies depending on the magnitude difference of the self-capacitance Cdp1 and the neighboring-capacitance Cdp2, the luminance of the entire display device increases by the data voltage, thereby solving the phenomenon of being displayed brightly.

That is, in order to compensate the bright luminance, when the self-capacitance Cdp1 and the neighboring-capacitance Cdp2 are appropriately adjusted so as to lower the luminance, the luminance brightness due to the data voltage is compensated.

At this time, there is a difference in the method of reducing the luminance per region based on the center of the display device. That is, referring to FIG. 5, the self-capacitance Cdp1 should be smaller than the neighboring-capacitance Cdp2 to reduce the luminance of the top of the display device, that is, the top of the white box. Therefore, to increase the neighboring-capacitance Cdp2, as shown in FIG. 2, the second protrusion 196b is added.

Again referring to FIG. 5, to reduce the luminance at the bottom of the display device, that is, the bottom of the white box, the self-capacitance Cdp1 should be smaller than the neighboring-capacitance Cdp2. Accordingly, to increase the self-capacitance Cdp1, as shown in FIG. 4, the area of the first protrusion 196a is increased.

In the above, the embodiment adjusting the self-capacitance Cdp1 and the neighboring-capacitance Cdp2 by using the first protrusion 196a and the second protrusion 196b as the part of the pixel electrode 191 was described. However, the self-capacitance Cdp1 and the neighboring-capacitance Cdp2 may be adjusted by controlling the width of the data line, not the pixel electrode 191.

Figure 10:
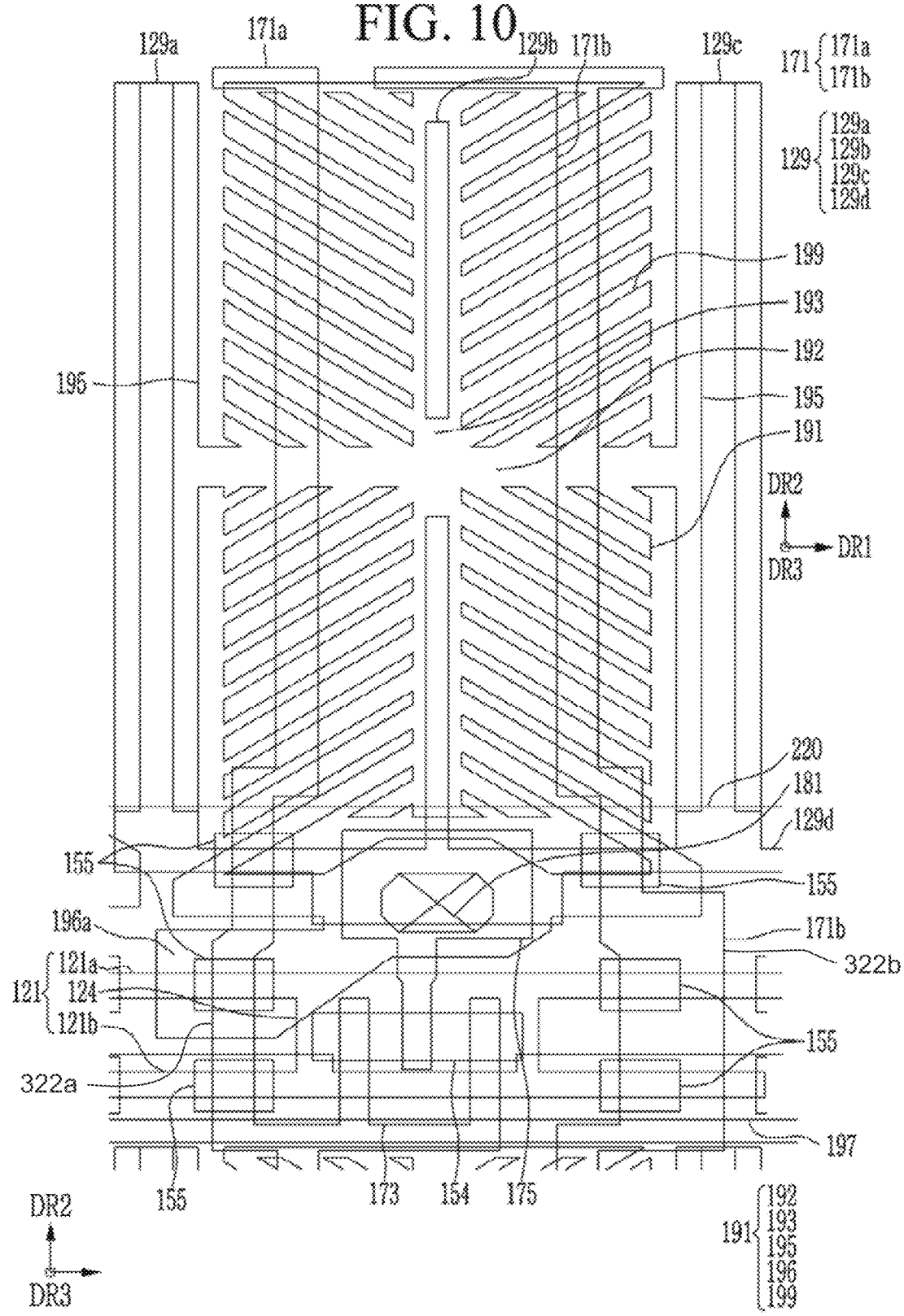
FIG. 10 is a top plan view of a pixel disposed in a first region A1 according to another embodiment.
Figure 11:
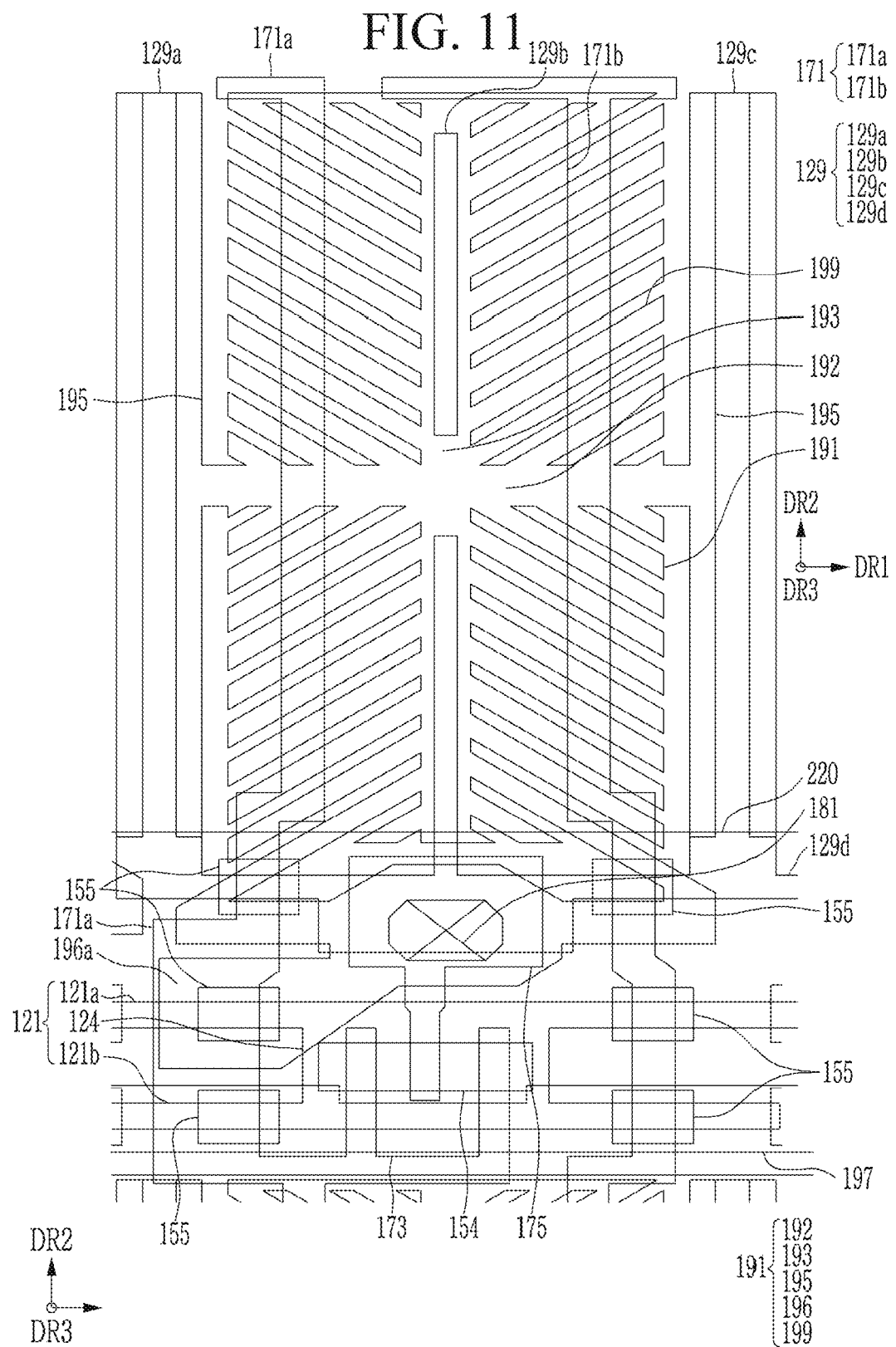
FIG. 11 is a top plan view of a pixel disposed in a second region A2 according to another embodiment.

FIG. 10 and FIG. 11 are views showing a pixel disposed in a first region A1 and a second region A2 in a display device according to another embodiment.

FIG. 10 is a top plan view of the pixel disposed in the first region A1, and FIG. 11 is a top plan view of the pixel disposed in the second region A2.

Referring to FIG. 10, in the pixel according to the present embodiment, the width of the second data line 171b expands in the region overlapping the light blocking member 220. In other words, by increasing the width of the second data line 171b without adding the configuration of the separate protrusion in the same layer as the pixel electrode 191, the overlap area of the existing pixel electrode 191 and the second data line 171b is increased. Therefore, since like FIG. 2 the neighboring-capacitance Cdp2 is larger than the self-capacitance Cdp1 and is in the upper region of the display device, the luminance is decreased in this case as confirmed from FIG. 5, and it is possible to compensate the luminance increase due to the data voltage. Other configurations are the same as those described above, and the detailed description of the same constituent elements is omitted.

Referring to FIG. 11, in the pixel according to the present embodiment, the width of the first data line 171a extends in the region overlapping the light blocking member 220. That is, without changing the area of the first protrusion 196a, by increasing the width of the first data line 171a, the overlapping area of the pixel electrode 191 and the first data line 171a increases. Accordingly, the self-capacitance Cdp1 is larger than the neighboring-capacitance Cdp2. Since the second region A2 is the lower end region of the display device, the luminance decreases as confirmed in FIG. 5, and accordingly, like in FIG. 4, the luminance increase of the data voltage may be compensated. Other configurations are the same as those described above, and the detailed description of the same constituent elements is omitted.

In the above, in the configuration in which the display device is divided into the first region A1 and the second region A2, the self-capacitance Cdp1 is smaller than the neighboring-capacitance Cdp2 in the first region A1, and the self-capacitance Cdp1 is larger than the neighboring-capacitance Cdp2 in the second region A2. However, in another embodiment, the difference between the self-capacitance Cdp1 and the neighboring-capacitance Cdp2 may increase and decrease stepwise.

Figure 12:
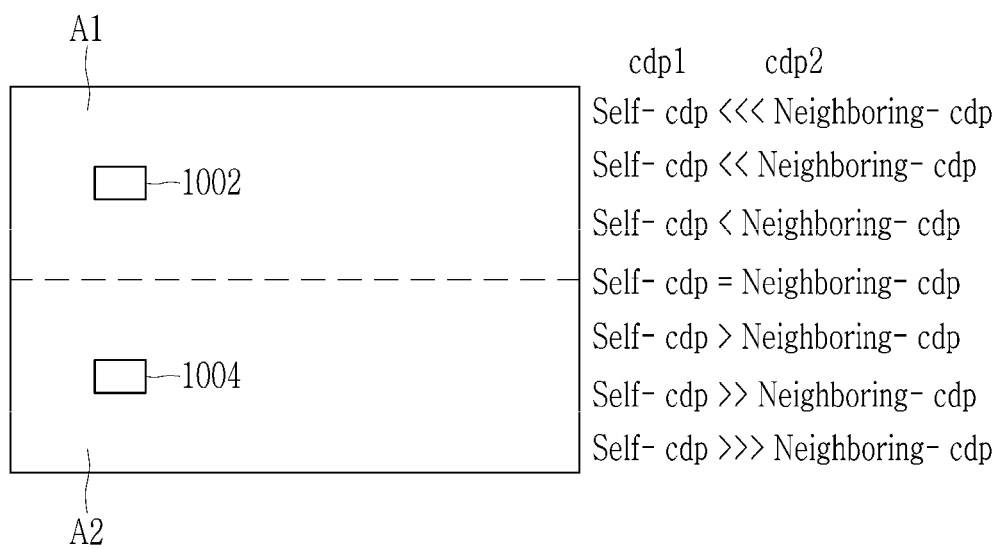
FIG. 12 is a view showing a display device according to another embodiment of the present inventive concept.

FIG. 12 is a view showing a display device 1000 according to another embodiment of the present inventive concept. Referring to FIG. 12, the difference between the self-capacitance Cdp1 and neighboring-capacitance Cdp2 is greatest in the uppermost region divided by the center of the display device 1000. However, the difference between the self-capacitance Cdp1 and the neighboring-capacitance Cdp2 decreases toward the center, and the self-capacitance Cdp1 and the neighboring-capacitance Cdp2 become equal at the center of the display device.

While passing through the center of the display device 1000, the self-capacitance Cdp1 is larger than the neighboring-capacitance Cdp2 at the lower side, and the difference therebetween increases farther away from the center. If the difference between the self-capacitance Cdp1 and the neighboring-capacitance Cdp2 is adjusted stepwise, the increase in luminance due to the data voltage may be effectively compensated.

The values of the self-capacitance Cdp1 and the neighboring-capacitance Cdp2 may be adjusted in various ways. That is, as shown in FIG. 2 to FIG. 4, these values may be adjusted by using the areas of the first protrusion 196a and the second protrusion 196b that are disposed on the same layer as the pixel electrode 191, and as shown in FIG. 10 and FIG. 11, by using the widths of the first data line 171a and the second data line 171b.

Since the capacitance increases as the area of the protrusion is larger or the width of the data line increases, a person of ordinary skill in the art may adjust the capacitance by increasing or decreasing the area or width stepwise by each region of the display device 1000.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A display device comprising:
a substrate including a first region and a second region; and
a plurality of pixels disposed on the substrate,
wherein the plurality of pixels each include a first data line and a second data line overlapping a pixel electrode,
the plurality of pixels includes a first pixel in the first region and a second pixel in the second region,
in the first pixel disposed in the first region, a first capacitance between the first data line and the pixel electrode is smaller than a second capacitance between the second data line and the pixel electrode,
in the second pixel disposed in the second region, the first capacitance between the first data line and the pixel electrode is larger than the second capacitance between the second data line and the pixel electrode, and
a difference between the first capacitance and the second capacitance in the first region decreases stepwise closer to an intersection of the first region and the second region.

2. The display device of claim 1, wherein
in the second region, a difference between the first capacitance and the second capacitance increases stepwise farther away from the intersection of the first region and the second region.

3. The display device of claim 1, wherein
the first capacitance and the second capacitance are equal at the intersection of the first region and the second region.

4. The display device of claim 1, wherein
the plurality of pixels each include:
a gate line disposed on the substrate; and
a data line disposed to be insulated from the gate line,
wherein the data line includes the first data line and the second data line,
the pixel electrode is disposed to overlap the first data line and the second data line,
a pixel electrode protrusion is connected to the pixel electrode,
the pixel disposed in the first region includes a second pixel electrode protrusion overlapping the second data line, and
an area of the first pixel electrode protrusion overlapping the first data line in the pixel disposed in the second region is larger than an area of the first pixel electrode protrusion overlapping the first data line of the pixel disposed in the first region.

5. The display device of claim 1, wherein
the pixel includes a display area and a light blocking area,
in the pixel disposed in the first region, the width of the first data line is narrower than the width of the second data line in the light blocking area, and
in the pixel disposed in the second region, the width of the first data line is wider than the width of the second data line in the light blocking area.

6. The display device of claim 1, wherein
the first data line is electrically connected to the pixel electrode of the first pixel, and
the second data line is not electrically connected to the pixel electrode that is electrically connected to the first data line.

* * * * *